US011993458B2

(12) United States Patent
Boivin et al.

(10) Patent No.: US 11,993,458 B2
(45) Date of Patent: May 28, 2024

(54) PACK THROUGH EJECT PANEL

(71) Applicant: THE HEIL CO., Chattanooga, TN (US)

(72) Inventors: Claude Boivin, Lévis (CA); Eric Boivin, Québec (CA); Hugo Marsan, Drummondville (CA)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/816,597

(22) Filed: Aug. 1, 2022

(65) Prior Publication Data

US 2023/0016127 A1 Jan. 19, 2023

Related U.S. Application Data

(63) Continuation of application No. 16/966,484, filed as application No. PCT/CA2018/050149 on Feb. 9, 2018, now Pat. No. 11,407,586.

(51) Int. Cl.

| | |
|---|---|
| ***B65F 3/22*** | (2006.01) |
| ***B65F 3/24*** | (2006.01) |
| ***B65F 3/28*** | (2006.01) |
| *B65F 3/00* | (2006.01) |

(52) U.S. Cl.

CPC .................. *B65F 3/22* (2013.01); *B65F 3/24* (2013.01); *B65F 3/28* (2013.01); *B65F 2003/006* (2013.01)

(58) Field of Classification Search

CPC .... B65F 3/201; B65F 3/22; B65F 3/24; B65F 3/28; B65F 2003/006

See application file for complete search history.

(56) References Cited

U.S. PATENT DOCUMENTS

| | | | | |
|---|---|---|---|---|
| 2,488,966 A | 11/1949 | Dear | | |
| 2,922,535 A * | 1/1960 | Balbi | B65F 3/201 | 414/679 |
| 3,490,631 A * | 1/1970 | Smith | B65F 3/143 | 414/525.6 |
| 3,508,673 A * | 4/1970 | Pappas | B65F 3/201 | 100/220 |
| 3,643,824 A * | 2/1972 | Partridge | B65F 3/26 | 100/232 |

(Continued)

FOREIGN PATENT DOCUMENTS

| | | | |
|---|---|---|---|
| EP | 0285467 A1 * | 10/1988 | B65F 3/201 |
| EP | 2058246 | 5/2009 | |

OTHER PUBLICATIONS

International Search Report and Written Opinion in International Appln. No. PCT/CA2018/050149, dated Oct. 29, 2018, 8 pages.

*Primary Examiner* — James Keenan
(74) *Attorney, Agent, or Firm* — Fish & Richardson P.C.

(57) ABSTRACT

There is disclosed a waste collecting device having a container for receiving waste therein. The container has an end wall and an ejector panel. The container encloses a waste receiving volume. The ejector panel has an opening therethrough for allowing access to the waste receiving volume for receiving the waste. The waste collecting device further has a compactor outside the waste receiving volume being operable for pushing the waste in the container through the opening. The ejector panel is movable within the waste receiving volume and relative to a floor of the container for pushing the waste out of the waste receiving volume. A method of operating a waste collecting device is also disclosed.

18 Claims, 8 Drawing Sheets

(56) References Cited

U.S. PATENT DOCUMENTS

| | | | | | |
|---|---|---|---|---|---|
| 3,872,984 | A * | 3/1975 | Moser | B65F 3/28 414/525.2 |
| 4,221,527 | A | 9/1980 | Morrison | |
| 4,260,317 | A | 4/1981 | Martin et al. | |
| 4,309,141 | A * | 1/1982 | Van Drie | B65F 3/28 414/509 |
| 4,640,659 | A | 2/1987 | Parks | |
| 4,948,323 | A | 8/1990 | Gasparini | |
| 5,421,689 | A * | 6/1995 | Boivin | B65F 3/14 414/517 |
| 5,857,822 | A | 1/1999 | Christenson | |
| 7,563,066 | B2 | 7/2009 | Jones et al. | |
| 10,427,871 | B2 | 10/2019 | Fillion et al. | |
| 11,407,586 | B2 | 8/2022 | Boivin et al. | |
| 11,667,469 | B2 * | 6/2023 | Betz, II | B65F 3/28 414/525.2 |
| 2003/0215315 | A1 | 11/2003 | Jones et al. | |

* cited by examiner

PACK THROUGH EJECT PANEL

CROSS-REFERENCE TO RELATED APPLICATION

This application is a continuation of U.S. patent application Ser. No. 16/966,484, filed on Jul. 31, 2020, which is a National Stage Application under 35 USC § 371 and claims the benefit of International Patent Application No. PCT/CA2018/050149, filed on Feb. 9, 2018, which are incorporated herein by reference in their entirety.

FIELD

The improvements generally relate to the field of waste collecting devices and more specifically to systems and methods used to compact waste and to unload waste containers.

BACKGROUND

Existing waste collecting devices typically have a container and a hydraulic piston that is used to lift the container at an angle relative to the ground. In such devices, the wastes flow out of the container with gravity. These devices may be unsuitable in waste facilities having a low-height ceiling. Moreover, lifting the container might be dangerous because the center of gravity of the container is raised at a high level above ground. This impairs the stability of a vehicle carrying the container. Moreover, hydraulic systems are very expensive, energy consuming, and might be prone to failure in low temperature operating conditions. Hence, improvements are possible.

SUMMARY

In accordance with a first embodiment, there is provided a waste collecting device configured for use mounted on a vehicle, the waste collecting device comprising a container for receiving waste therein, the container having a first end and a second end spaced apart from the first end along a longitudinal axis, the container further having an end wall located at the first end and an ejector panel located at the second end, the container enclosing a waste receiving volume between the end wall and the ejector panel, the ejector panel having an opening therethrough for allowing access to the waste receiving volume for receiving the waste, the waste collecting device further having a compactor located adjacent the second end and being outside the waste receiving volume, the compactor operable for pushing the waste in the container through the opening, the ejector panel movable along the longitudinal axis between the first and second ends within the waste receiving volume and relative to a floor of the container for pushing the waste out of the waste receiving volume when unloading the container.

Still further in accordance with the first embodiment, a footprint area of the ejector panel corresponds to an internal cross-sectional area of the container taken perpendicularly to the longitudinal axis.

Still further in accordance with the first embodiment, the end wall is a door pivotally mounted to a remainder of the container, the door being pivotable between a closed position and an opened position, the door allowing access to the waste receiving volume in the opened position for emptying the container.

Still further in accordance with the first embodiment, the waste collecting device further comprises a blocking device operable for closing the opening when the ejector panel moves between the first and second ends for pushing the waste out of the container.

Still further in accordance with the first embodiment, the blocking device is secured to the ejector panel, the blocking device including two stems movable along a direction perpendicular to a central axis of the opening between a first position in which the two stems extend through the opening and a second position in which the two stems are offset from the opening.

Still further in accordance with the first embodiment, the compactor is a screw conveyor rotatable along a rotation axis, the screw conveyor including a screw in driving engagement with a motor.

Still further in accordance with the first embodiment, the waste collecting device further comprises a motor secured to the ejector panel, the motor being in driving engagement with rails secured to lateral walls of the container, the rails and the lateral walls extending between the first end and the second end, the motor operable to move the ejector panel relative to the rails.

Still further in accordance with the first embodiment, the container includes an upper half and a lower half, the upper half defining the end wall and the ejector panel, the lower half defining the floor of the container, the upper half being slidably movable along the longitudinal axis relative to the lower half.

Still further in accordance with the first embodiment, the waste collecting device further comprises rails secured to lateral walls of the container and a motor, the motor being selectively drivingly engageable in a compacting configuration and a discharging configuration, the motor being in driving engagement with the compactor in the compacting configuration, the motor being in driving engagement with the rails in the discharging configuration for moving the ejector panel.

Still further in accordance with the first embodiment, the compactor is secured to the ejector panel and moves integrally therewith.

In accordance with a second embodiment, there is provided a vehicle for collecting waste, comprising a frame and a waste collecting device secured to the frame, the waste collecting device having a container for receiving waste therein, the container having a first end and a second end spaced apart from the first end along a longitudinal axis, the container further having an end wall located at the first end and an ejector panel located at the second end, the container enclosing a waste receiving volume between the end wall and the ejector panel, the ejector panel having an opening therethrough for allowing access to the waste receiving volume for receiving the waste, the waste collecting device further having a compactor located adjacent the second end and being outside the waste receiving volume, the compactor operable for pushing the waste in the container through the opening, the ejector panel movable along the longitudinal axis between the first and second ends within the waste receiving volume and relative to a floor of the container for pushing the waste out of the waste receiving volume when unloading the container.

Still further in accordance with the second embodiment, a footprint area of the ejector panel corresponds to an internal cross-sectional area of the container taken perpendicularly to the longitudinal axis.

Still further in accordance with the second embodiment, the end wall is a door pivotally mounted to a remainder of the container, the door being pivotable between a closed position and an opened position, the door allowing access to the waste receiving volume in the opened position for emptying the container.

Still further in accordance with the second embodiment, the waste collecting device further comprises a blocking device for closing the opening when the ejector panel moves between the first and second ends for pushing the waste out of the container.

Still further in accordance with the second embodiment, the compactor is a screw conveyor rotatable along a rotation axis, the screw conveyor including a screw in driving engagement with a motor.

Still further in accordance with the second embodiment, the waste collecting device further comprises a motor secured to the ejector panel, the motor being in driving engagement with rails secured to lateral walls of the container, the rails and the lateral walls extending between the first end and the second end, the motor operable to move the ejector panel relative to the rails.

Still further in accordance with the second embodiment, the container includes an upper half and a lower half, the upper half defining the end wall and the ejector panel, the lower half defining the floor of the container, the upper half being slidably movable along the longitudinal axis relative to the lower half.

Still further in accordance with the second embodiment, the waste collecting device further comprises rails secured to lateral walls of the container and a motor, the motor being selectively drivingly engageable in a compacting configuration and a discharging configuration, the motor being in driving engagement with the compactor in the compacting configuration, the motor being in driving engagement with the rails in the discharging configuration for moving the ejector panel.

Still further in accordance with the second embodiment, the compactor is secured to the ejector panel and moves integrally therewith.

In a third embodiment, there is provided a method of operating a waste collecting device, comprising: receiving waste in a compactor located outside a waste receiving volume of a container; pushing the waste in the waste receiving volume through an opening defined in an ejector panel; and moving the ejector panel relative to a floor of the container for emptying the container.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
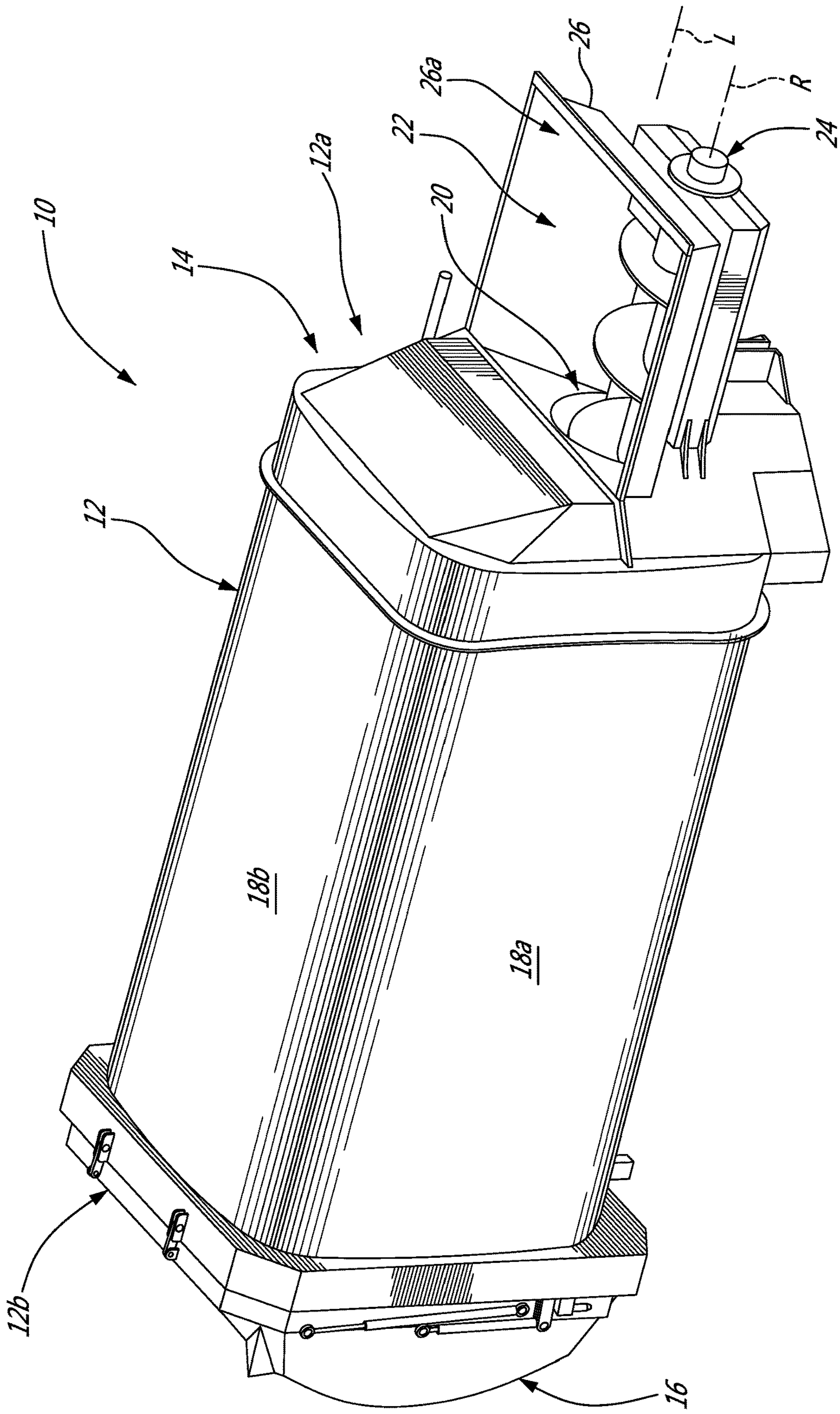
FIG. 1 is an oblique view of a waste collecting device in accordance to one embodiment.

Referring to FIGS. 1-6, a waste collecting device in accordance with an embodiment is shown at 10. The waste collecting device 10 is configured to be used mounted on a vehicle. The device 10 includes a container 12 for receiving waste. The container 12 extends between a first end **12*a* and a second end 12*b* spaced apart from the first end 12*a* along a longitudinal axis L of the container 12. Herein below, the first and second ends are referred to as front and rear ends 12*a*, 12*b* for clarity. It is however understood that the front and rear ends 12*a*, 12*b* may be reversed relative to a direction of travel of a vehicle having the device 10** mounted thereon without departing from the scope of the present disclosure.

The container 12 has a first end wall 14 located at the front end **12*a* and a second end wall 16 located at the rear end 12*b*. The container 12 further has side walls 18 extending along the longitudinal axis L from the front end 12*a* wall to the second end 12*b*. The side walls 18 include two lateral walls 18*a*, a ceiling 18*b*, and a floor 18*c*. As shown, the walls 14, 16, 18 of the container 12 encloses a waste receiving volume V. In the embodiment shown, a waste opening 20 is defined through the first end wall 14 for allowing access to the waste receiving volume V. The waste, when collected, is inserted in the waste receiving volume V of the container 12 via the waste opening 20**. In the embodiment shown, the waste opening has an area of about one square meter.

To maximize a quantity of waste contained within the container 12 and to push the waste in the container 12, the waste collecting device 10 is equipped with a compactor 22. The compactor 22 is located at the front end **12*a* and is operable to push the waste in the container 12 via the waste opening 20. The compactor 22 is configured to exert a force on the waste such as to increase a density of the waste contained within the container 12. In the embodiment shown, the compactor 22 is located outside the waste receiving volume V and is located adjacent the waste opening 20 defined through the first end wall 14 so that the compactor 22 has access to the waste opening 20 and hence to the waste receiving volume V of the container 12**.

In the embodiment shown, the compactor 22 is a screw conveyor including a screw **22*a* (FIG. 3) in driving engagement with a first motor 24, which may be electric or hydraulic. In operation, the screw 22*a* rotates about a rotation axis R. The waste is then received between threads of the screw 22*a* and, when the screw 22*a* is in rotation, the threads carry the waste in a direction parallel to the rotation axis R. In the embodiment shown, the rotation axis R of the screw 22*a* is parallel to the longitudinal axis L of the container 12. A gearbox/reductor may be used to increase a torque of the first motor 24 to increase a compaction ratio of the compactor 22. It is understood that the compactor 22 may be provided in the form of a piston engaged by hydraulic actuator(s); the piston having a reciprocating movement that may be parallel to the longitudinal axis L for pushing the waste through the opening 20**.

Figure 2:
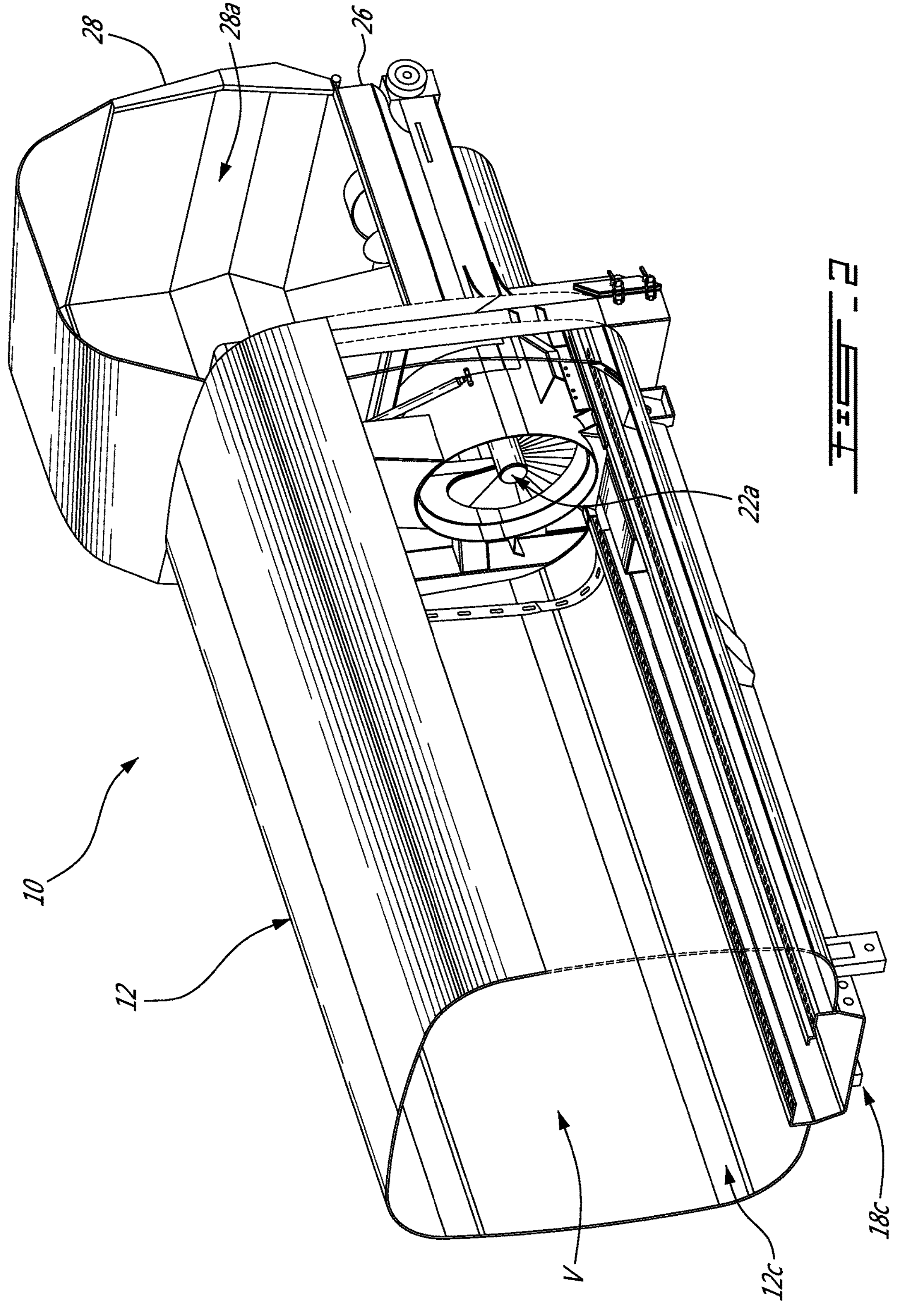
FIG. 2 is an oblique partially transparent view of the waste collecting device of FIG. 1.
Figure 3:
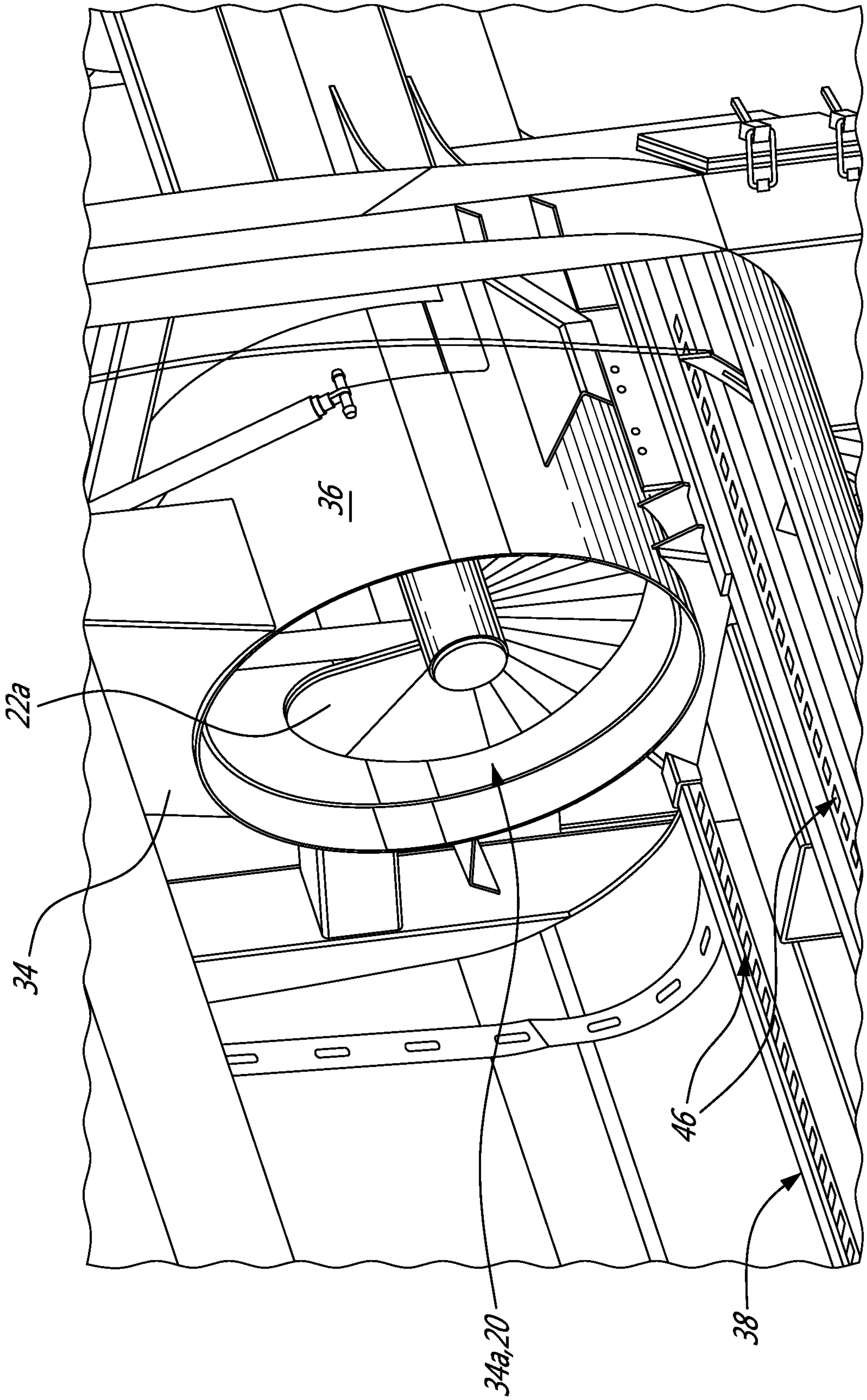
FIG. 3 is an oblique partially transparent view of a portion of the waste collecting device of FIG. 2.

Referring more particularly to FIGS. 1-2, the waste collecting device 10 further includes a hopper 26 that is located above the compactor 22. The hopper 26 may be secured to the container 12. The hopper 26 defines a waste receiving area **26*a* that is greater than a diameter of the screw 22*a*. Therefore, the hopper 26 temporarily holds the waste before it reaches the compactor 22 to be pushed thereby through the waste opening 20. Stated otherwise, the hopper 26 guides the waste toward the compactor 22** for subsequent compaction.

In the embodiment shown, the waste collecting device 10 further includes an enclosure 28 that may be affixed to the hopper 26 and/or to the first end wall 14. The enclosure 28 is located above the hopper 26 and the compactor 22. In the illustrated embodiment, the enclosure 28 is configured to allow access to the compactor 22 solely via an opening 28*a* located on a side thereof. Hence, the enclosure 28 might preclude waste from falling out of the hopper 26 when the waste is thrown toward the compactor 22. The enclosure 28 might also allow access to the compactor 22 solely to an operator of the waste collecting device 10 for security purposes.

Figure 4:
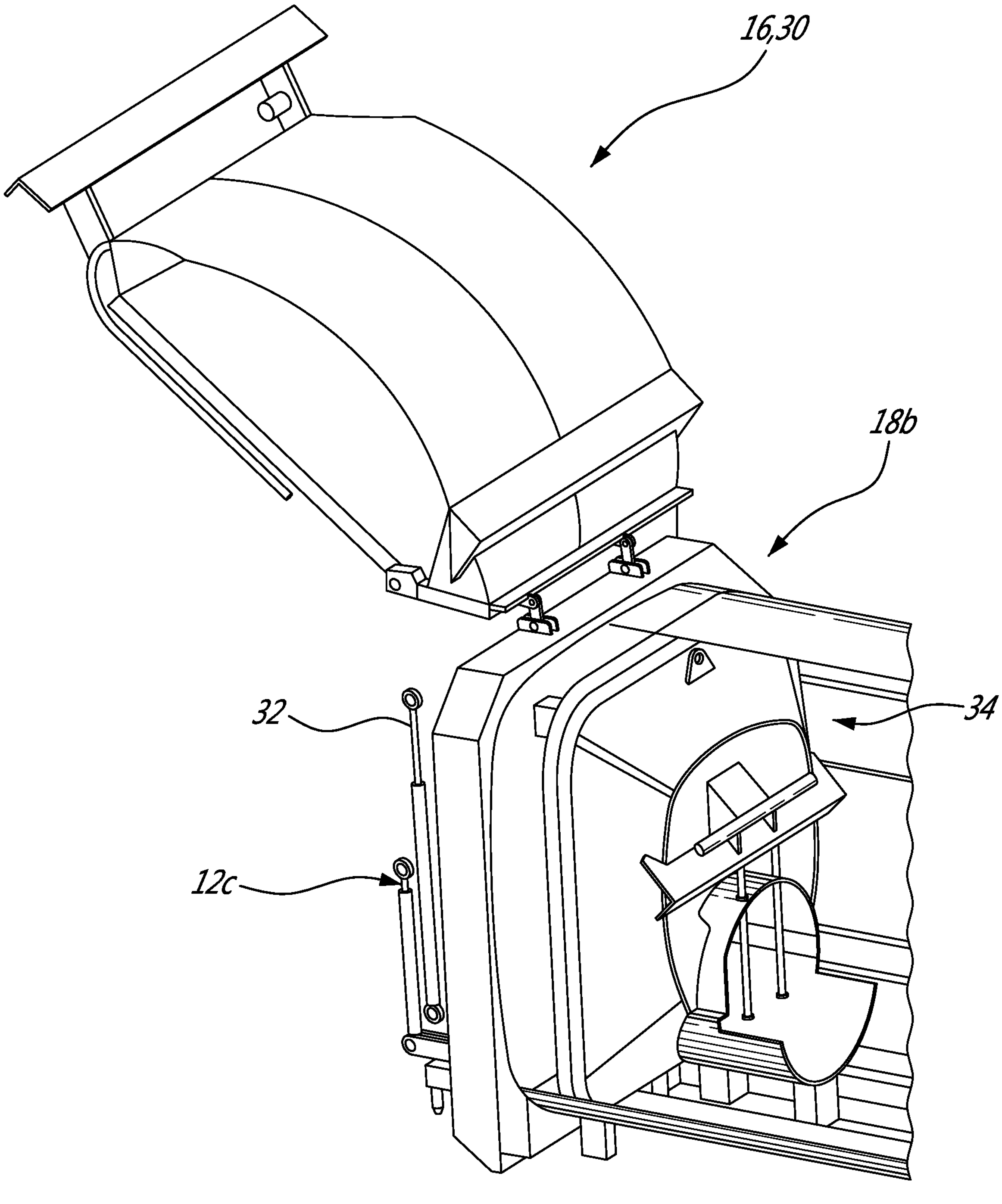
FIG. 4 is an oblique partially transparent view of a rear section of the waste collecting device of FIG. 1.

Referring more particularly to FIG. 4, the second end wall 16 of the container 12 is a door 30 that is pivotally mounted to a remainder of the container 12 and that is used for closing a discharging opening 12*c* of the container 12. More specifically, the door 30 is pivotally mounted to a rear edge of the ceiling 18*b* of the container 12. In the depicted embodiment, the door 30 rotates about an axis of rotation that is perpendicular to the longitudinal axis L and perpendicular to the lateral walls 18*a* The door 30 may be actuated using, for instance, hydraulic or electric actuators 32, or any suitable mechanism known in the art. The door 30 is pivotable between a closed position and an opened position. In the opened position, the door 30 allows access to the waste receiving volume V for emptying the container 12. When filling the container 12, the door 30 is usually in the closed position so that the waste is retained within the container 12.

Figure 5:
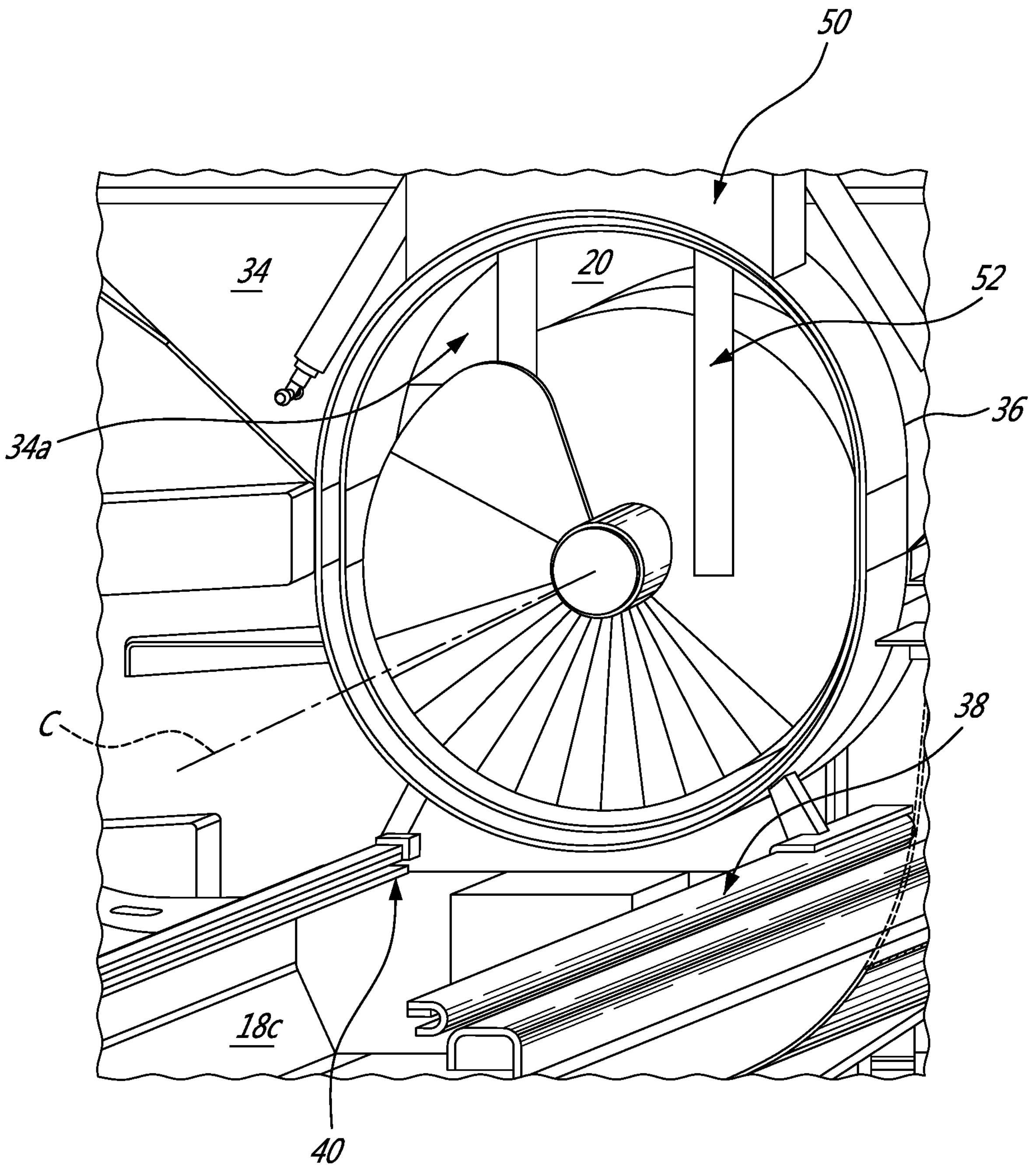
FIG. 5 is an oblique rear partially transparent view of a portion of the waste collecting device shown in FIG. 2.
Figure 6:
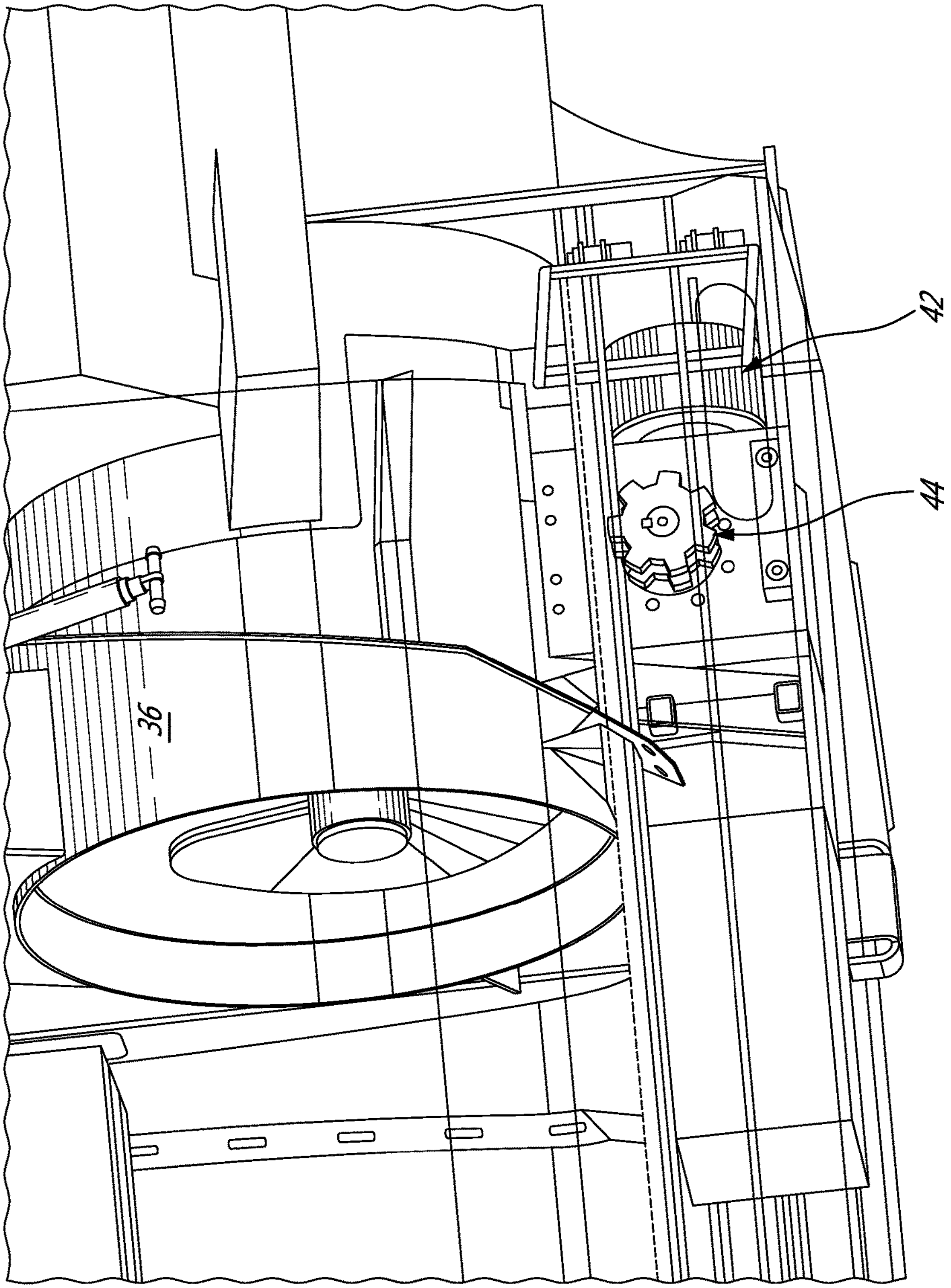
FIG. 6 is an oblique side elevation partially transparent view of the waste collecting device shown in FIG. 5.

Referring more particularly to FIGS. 4-6, the waste collecting device 10 further includes an ejector panel 34 for pushing the waste out of the container 12. The ejector panel 34 has a waste opening 34*a* (FIG. 5) defined therethrough that registers with the waste opening 20 defined through the first end wall 14. The registering waste openings 20, 34*a* of the first end wall 14 and of the ejector panel 34 allow the waste to be inserted in the waste receiving volume V of the container 12 through both the first end wall 14 and the ejector panel 34. The ejector panel 34 is movable along the longitudinal axis L between the front and rear ends 12*a*, 12*b* and relative to the floor 18*c* of the container 12. This movement of the ejector panel 34 pushes the waste toward the discharging opening 12*c* of the container 12 and out of the waste receiving volume V via said opening 12*c*. It is understood that the ejector panel 34 and the first end wall 14 may be a sole entity that is entirely movable along the longitudinal axis L.

In the embodiment shown, a footprint area of the ejector panel 34 corresponds substantially to an internal cross-sectional area of the container 12 taken perpendicularly to the longitudinal axis L. The footprint area might be slightly less than the internal cross-sectional area to allow the ejector panel 34 to move between the first and second ends 12*a*, 12*b* without contacting the side walls 18. In a particular embodiment, having the ejector panel 34 covering almost an entirety of the internal cross-sectional area allows all the waste to be pushed out of the container 12 in a unique pass, without requiring a plurality of passes of the ejector panel 34 within the container 12. Moreover, by being dimensioned as shown, the ejector panel 34 might prelude waste from escaping behind the panel 34 via gaps between edges of the ejector panel and the side walls 18.

In the embodiment shown, the first end wall 14 and the ejector panel 34 define conjointly a cylindrical conduit 36 that connects the waste openings 20, 34*a* of the first end wall 14 and of the ejector panel 34. In the embodiment illustrated, the compactor screw 22*a* extends through the cylindrical conduit 36, which contributes in guiding the waste toward the waste receiving volume V. The conduit 36 might preclude waste from falling between the first end wall 14 and the ejector panel 34.

Referring now more particularly to FIGS. 5-6, the floor 18*c* of the container 12 has rails 38 affixed thereto and that are used for guiding the ejector panel 34 along its course between the front and rear ends 12*a*, 12*b*. The rails 38 are configured to be engaged by corresponding elements of the ejector panel, which are tabs 40 in the embodiment shown. Roller bearings may be disposed between the tabs 40 and the rails 38 to ease the translational movement of the ejector panel 34. Other configurations are contemplated. It is understood that the rails 38 may be located at other locations, for instance, on the lateral walls 18*a* between the floor 18*c* and the ceiling 18*b*, or secured to the ceiling 18*b*.

The waste collecting device 10 includes a second motor 42, which may be electric or hydraulic, for inducing movement of the ejector panel 34. In the embodiment shown, the second motor 42 is secured to the ejector panel 34 below the waste opening 20 and is in driving engagement with the rails 38. More specifically, the second motor 42 transmits its rotational input to gears 44 (FIG. 6) that are in a mating engagement with apertures 46 (FIG. 3) defined through the rails 38. Such an engagement causes the ejector panel 34 and the second motor 42 secured thereto to move relative to the rails 38 of the floor 18*c* toward the second end wall 16. The gears 44 may be either directly engaged by the second motor 42 or via a gear box or any suitable transmission mechanism known in the art. Therefore, actuation of the second motor 42 induces rotation of the gears 44 that engage the rails 38. It is understood that any suitable mechanism that may be used to move the ejector panel 34 along the longitudinal axis L without departing from the scope of the present disclosure. In the embodiment shown, the compactor 22 remains substantially immobile relative to the floor 18*c* when the ejector panel 34 moves for emptying the container 12.

The waste opening 34*a* of the ejector panel 34 is preferably blocked when emptying the container 12 to avoid waste from falling in a space located axially between the first end wall 14 and the ejector panel 34. If that would occur, it might preclude the ejector panel 34 from going back to its original position. Therefore, the waste collecting device 10 includes a blocking device 50. In the depicted embodiment, the blocking device 50 is affixed to the ejector panel 34 and includes two stems 52 that may be actuated by, for instance, hydraulic or electric actuators (not shown). In use, the blocking device 50 is operable to move the stems 52 in a direction perpendicular to a central axis C of the waste openings 20, 34*a* and from a first position in which the stems 52 extend through the waste openings 20, 34*a* and a second position in which the stems 52 are offset from the waste openings 20, 34*a*. Stated otherwise, in the second position of the stems 52, the stems 52 do not offer resistance to the waste circulating within the cylindrical conduit 36. In the first position, the stems 52 extend through the cylindrical conduit 36.

Figure 7:
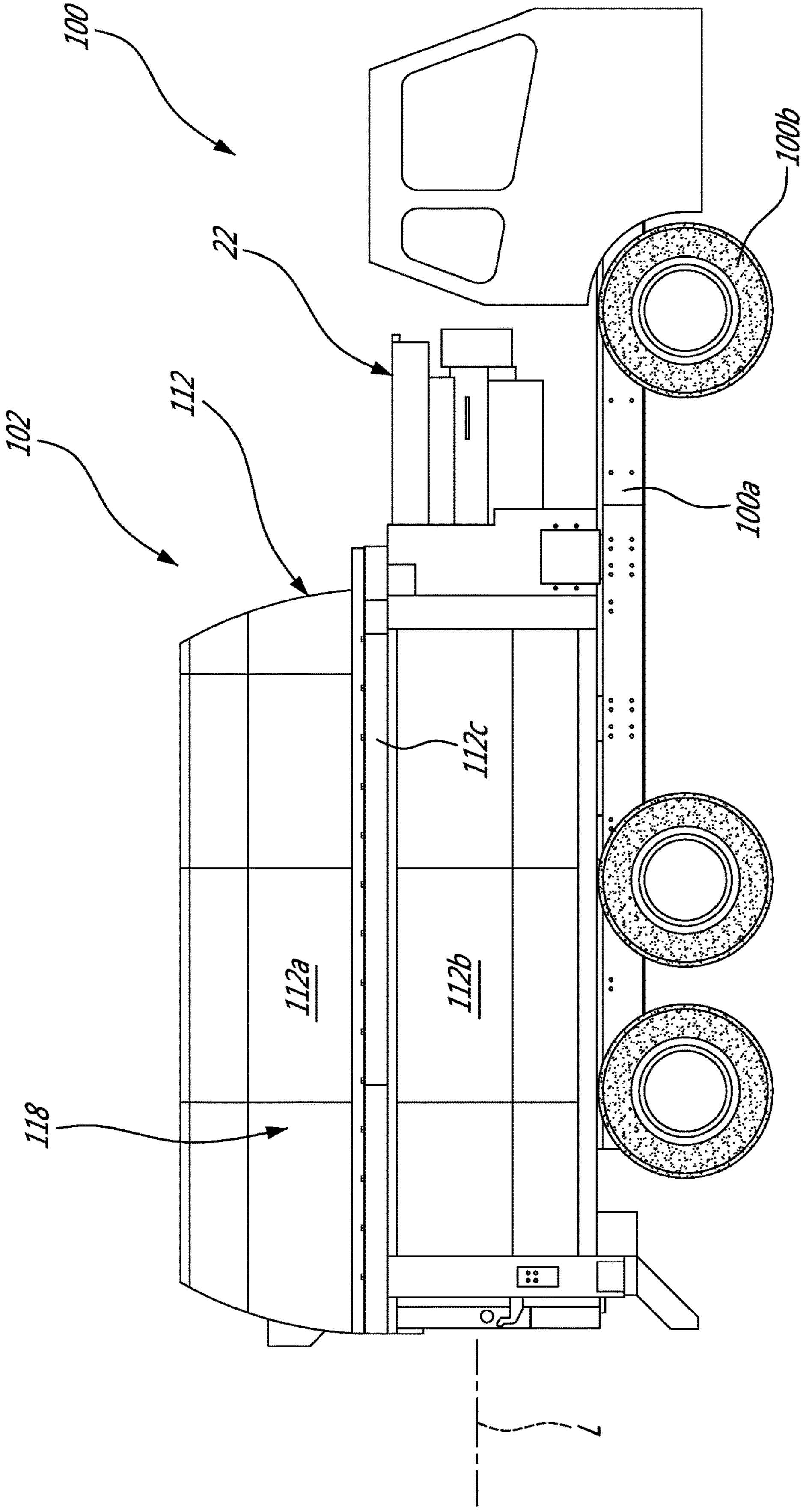
FIG. 7 is a side elevation view of a vehicle equipped with a waste collecting device in accordance with another embodiment.
Figure 8:
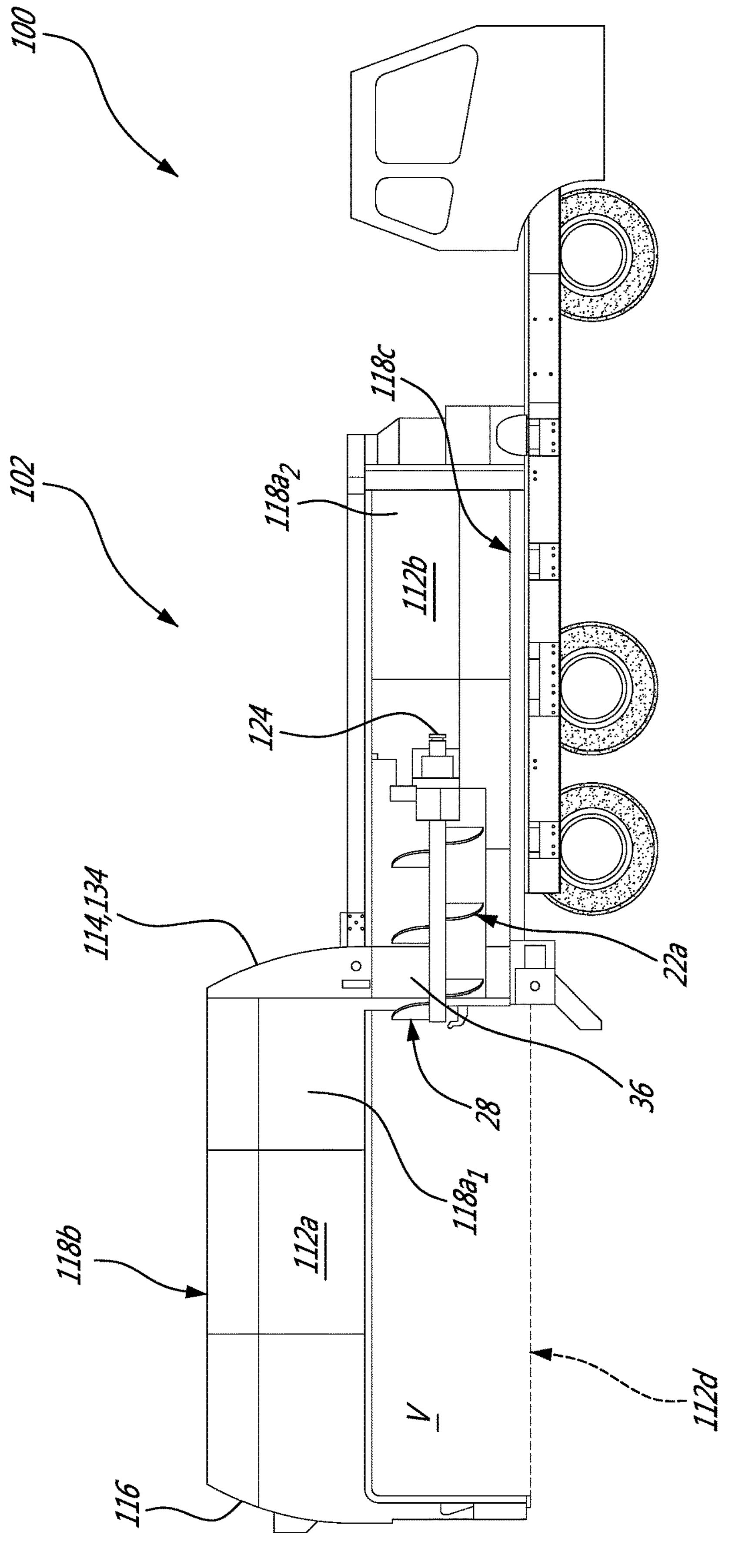
FIG. 8 is a side elevation view of the vehicle of FIG. 7 in an unloading state.

Referring now to FIGS. 7-8, a vehicle for collecting waste is shown at 100. The vehicle 100 includes a frame 100*a*, wheels 100*b* rotatably mounted to the frame 100*a*, and a waste collecting device 102 that is secured to the frame 100*a*. For the sake of conciseness, only elements that differ from the waste collecting device 10 of FIGS. 1-6 are described herein below.

In the embodiment shown, a container 112 includes two halves: an upper half 112*a* and a lower half 112*b*. The upper half 112*a* includes a first end wall 114, a second end wall 116, a ceiling 118*b*, and an upper section 118$a_1$ of each of lateral walls 118*a*. The lower half 112*b* is substantially immobile relative to the frame 100*a* and includes a lower section 118$a_2$ of each of the lateral walls 118 and a floor 118*c*. The upper half 112*a* is movable relative to the lower half 112*b* along the longitudinal axis L.

In the embodiment shown, the compactor 22 is secured to the first end wall 114, which corresponds, in this embodiment, to an ejector panel 134. The compactor 22 moves with the first end wall 114 and the upper half 112*a*. More specifically, the compactor 22 is secured to a lower portion of the first end wall 114. As shown, the screw 22*a* remains within the cylindrical conduit 36 of the first end wall 114 when the upper half 112*a* moves. Hence, in the embodiment shown, the blocking device that precludes the waste from falling behind the first end wall 114 corresponds to the screw 22*a* of the compactor 22. Hence, the stems and the actuators that drives them are not required for the waste collecting device of this embodiment.

The upper half 112*a* and the lower half 112*b* define a sliding interface 112*c* therebetween. The sliding interface 112*c* is located along adjacent edges of the upper and lower sections 118$a_1$, 118$a_2$ of the lateral walls 118. Roller bearings may be disposed within the sliding interface 112*c* between said edges for easing a movement of the upper half 112*a* relative to the lower half 112*b*. Other configurations are contemplated.

In the embodiment shown, the movement of the upper half 112*a* relative to the lower half 112*b* is controlled by a single motor 124, which may be hydraulic or electric. A system similar to the one described with reference to FIGS. 1-6 may be used. More specifically, rails may be secured to the edges of the lower sections 118$a_2$ of the lateral walls 118*a*. Gears that are in a mating engagement with the rails may be drivingly engaged by the motor 124 for inducing a translation of the upper half 112*a* relative to the lower half 112*b* along axis L. Any suitable transmission system may be used to transmit a rotational input of the motor 124 to said gears.

In the embodiment shown, the compactor 22 is driven by the same motor 124 that induces the translation of the upper half 112*a*. Stated otherwise, only one motor 124 is used to drive both the compactor 22 and to move the upper half 112*a*. It is understood that any suitable device, such as a clutch, may be used to direct the rotational input of the motor 124 to the desired function (e.g., compacting or emptying/discharging). In the embodiment shown, a discharging opening 112*d* corresponds to a bottom portion of the container 112. The floor 118*c* is used to close the discharging opening 112*d*. To open the opening 112*d*, the floor 118*c* is moved relative to a remainder of the container 112.

In particular embodiment, the motor 124 may be selectively drivingly engageable in a compacting configuration and in a discharging configuration. In the compacting configuration, the motor 124 may be in driving engagement with the compactor 22, more specifically to the compactor screw 22*a*. In the discharging configuration, the motor 124 may be in driving engagement with the rails such as described with reference to FIGS. 1-6 for moving the ejector panel 34 for discharging or emptying the container 112. The motor 124 may be drivingly disengaged from the rails when operated in the compacting configuration and may be drivingly disengaged from the compactor 22 in the discharging configuration.

As aforementioned, the first and second end walls 114, 116 and the compactor 22 move with the upper half 112*a* of the container 112. Hence, the second end wall 116 is not a door and is fixed to a remainder of the container upper half 112*a*. Therefore, in this embodiment, there is no requirement to use actuators to open the door. In a particular embodiment, the reliability of the disclosed waste collecting device 102 is better than that of a device using hydraulic actuators because such actuators are known to be less efficient in cold temperatures. Moreover, the waste collecting device 102 might be more efficient than a similar device having hydraulic actuators because such actuators are very energy consuming.

For operating the waste collecting devices 10, 102, waste is received in the compactor 22 that is located outside the waste receiving volume V of the container 12, 112. The waste is pushed in the waste receiving volume V through the waste opening 20, 34*a* defined in the ejector panel 34, 134. For emptying the container 12, 112, the ejector panel 34, 134 moves relative to the floor 18*c*, 118*c* of the container 12, 112 toward the rear end 12*b*. In the embodiment of FIGS. 7-8, the ejector panel 134 moves with the compactor 22.

In a particular embodiment, the waste collecting devices 10, 102 equipped with the screw conveyor 22 are more efficient than other devices equipped with other types of compactor because screw conveyors have a higher compaction ratio than other devices for a same amount of energy. In both of the above-described embodiments, the containers 12, 112 remain parallel to the ground. Hence, a stability of such devices 10, 102 is better than other waste collecting device requiring tilting the container for discharging. Moreover, keeping the container parallel to the ground allow discharging the waste in low-ceiling facilities. Not having to tilt the container might allow for a reduction of parts and installation time because there is no requirement to install hydraulic hoses and electric wires via a hinge. This might allow an economy in parts and in installation time for the disclosed waste collecting devices compared to a device where the container is hingely mounted to the vehicle's frame. In a particular embodiment, the ejector panel 34, 134 is more effective in emptying the container compared to gravity. Hence, an operator might be required to clean the container less frequently compared to a device where the container must be tilted.

As can be understood, the examples described above and illustrated are intended to be exemplary only. The scope is indicated by the appended claims.

What is claimed is:

1. A waste collecting device configured for use mounted on a vehicle, the waste collecting device comprising:

a container for receiving waste therein, the container having a first end and a second end spaced apart from the first end along a longitudinal axis, the container comprising:

an end wall located at the first end; and an ejector panel, the container enclosing a waste receiving volume between the end wall and the ejector panel, wherein the ejector panel is configured to push waste through and out of the waste receiving volume during an unloading sequence by moving along the longitudinal axis between the first and second ends within the waste receiving volume and relative to a floor of the container;

a compactor located adjacent the second end of the container outside the waste receiving volume, the compactor operable for pushing the waste in the container through an opening in the ejector panel into the waste receiving volume;

a blocking device coupled to the ejector panel and configured to move along a direction perpendicular to the longitudinal axis between a first position, in which the blocking device inhibits waste in the waste receiving volume from entering the opening as the ejector panel moves along the longitudinal axis, and a second position, in which waste is uninhibited from entering the waste receiving volume through the opening; and a wall extending outward from a surface of the ejector panel and surrounding the opening in the ejector panel, the wall forming a cylindrical conduit configured to guide waste towards the waste receiving volume.

2. The waste collecting device of claim 1, wherein a footprint area of the ejector panel corresponds to an internal cross-sectional area of the container taken perpendicularly to the longitudinal axis.

3. The waste collecting device of claim 1, wherein the end wall is a door pivotally mounted to a remainder of the container, the door being pivotable between a closed position and an opened position, the door allowing access to the waste receiving volume in the opened position for unloading the container.

4. The waste collecting device of claim 1, wherein the blocking device comprises at least one stem that extends through the opening in the first position and is offset from the opening in the second position.

5. The waste collecting device of claim 1, wherein the blocking device comprises two parallel stems, wherein each of the two parallel stems extends through the opening in the first position and is offset from the opening in the second position.

6. The waste collecting device of claim 1, wherein the compactor is a screw conveyor rotatable along a rotation axis, the screw conveyor including a screw in driving engagement with a motor.

7. The waste collecting device of claim 1, further comprising a motor secured to the ejector panel, the motor being in driving engagement with rails secured to lateral walls of the container, the rails and the lateral walls extending between the first end and the second end, the motor operable to move the ejector panel relative to the rails.

8. The waste collecting device of claim 1, wherein the wall extends from the surface of the ejector panel towards the second end of the container.

9. The waste collecting device of claim 8, wherein:

the container further comprises a second end wall located at the second end, the second end wall defining a waste opening therethrough; and the wall extending from the ejector panel is configured to cooperate with the waste opening through the second end wall.

10. A vehicle for collecting waste, the vehicle comprising:

a frame; and a waste collecting device secured to the frame, the waste collecting device comprising:

a container for receiving waste therein, the container having a first end and a second end spaced apart from the first end along a longitudinal axis, the container comprising:

an end wall located at the first end; and an ejector panel, the container enclosing a waste receiving volume between the end wall and the ejector panel, wherein the ejector panel is configured to push waste through and out of the waste receiving volume during an unloading sequence by moving along the longitudinal axis between the first and second ends within the waste receiving volume and relative to a floor of the container a compactor located adjacent the second end of the container outside the waste receiving volume, the compactor operable for pushing the waste in the container through an opening in the ejector panel into the waste receiving volume;

a blocking device coupled to the ejector panel and configured to move along a direction perpendicular to the longitudinal axis between a first position, in which the blocking device inhibits waste in the waste receiving volume from entering the opening as the ejector panel moves along the longitudinal axis, and a second position, in which waste is uninhibited from entering the waste receiving volume through the opening; and a wall extending outward from a surface of the ejector panel and surrounding the opening in the ejector panel, the wall forming a cylindrical conduit configured to guide waste towards the waste receiving volume.

11. The vehicle of claim 10, wherein a footprint area of the ejector panel corresponds to an internal cross-sectional area of the container taken perpendicularly to the longitudinal axis.

12. The vehicle of claim 10, wherein the end wall is a door pivotally mounted to a remainder of the container, the door being pivotable between a closed position and an opened position, the door allowing access to the waste receiving volume in the opened position for unloading the container.

13. The vehicle of claim 10, wherein the blocking device comprises at least one stem that extends through the opening in the first position and is offset from the opening in the second position.

14. The vehicle of claim 10, wherein the blocking device comprises two parallel stems, wherein each of the two parallel stems extends through the opening in the first position and is offset from the opening in the second position.

15. The vehicle of claim 10, wherein the compactor is a screw conveyor rotatable along a rotation axis, the screw conveyor including a screw in driving engagement with a motor.

16. The vehicle of claim 10, further comprising a motor secured to the ejector panel, the motor being in driving engagement with rails secured to lateral walls of the container, the rails and the lateral walls extending between the first end and the second end, the motor operable to move the ejector panel relative to the rails.

17. The vehicle of claim 10, wherein the wall extends from the surface of the ejector panel towards the second end of the container.

18. The vehicle of claim 17, wherein:

the container further comprises a second end wall located at the second end, the second end wall defining a waste opening therethrough; and the wall extending from the ejector panel is configured to cooperate with the waste opening through the second end wall.

* * * * *